Patented Oct. 27, 1931

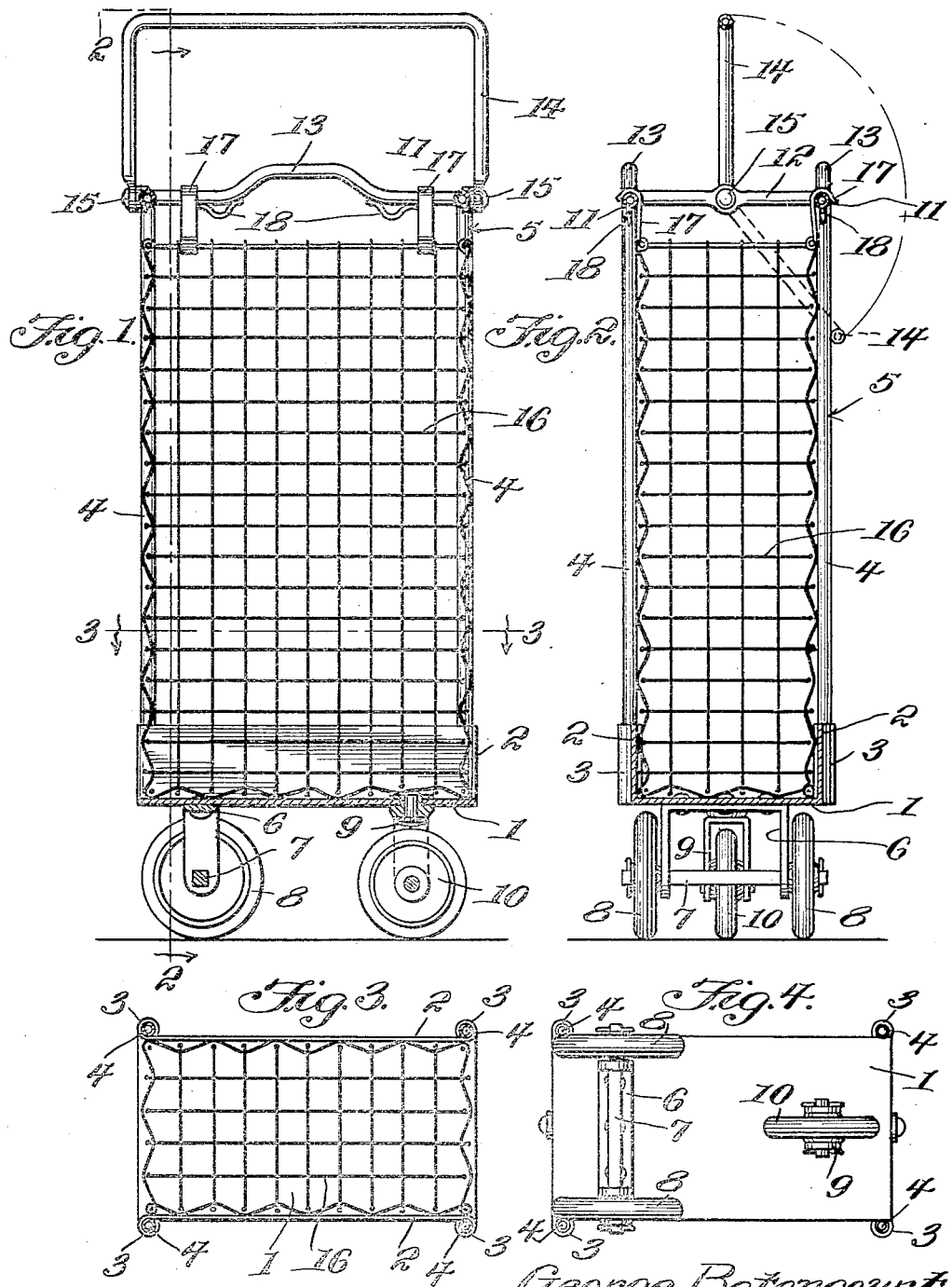

1,829,629

UNITED STATES PATENT OFFICE

GEORGE BETANCOURT, OF ALHAMBRA, CALIFORNIA

CARRYING DEVICE

Application filed February 28, 1931. Serial No. 519,222.

This invention relates to carrying devices and is especially adaptable for persons shopping, picnicking, carrying golf clubs about golf courses and many other purposes wherein it is desired to relieve a person of the burden of carrying a number of articles or packages totaling considerable weight and has for the primary object, the provision of a portable device which may be easily and quickly moved by a person from one place to another without undue effort or the burden of carrying and which is capable of containing a large number of articles at one time.

Another object of this invention is the provision of a frame mounted on wheels and having removably fitted thereto a basket or other container where many packages may be conveniently placed therein and removed when desired and which will permit a person to easily transport the packages from one place to another without having the annoyance and labor of carrying the packages and which device is of such a size and construction that it may be conveniently lifted into and out of vehicles and when therein will not occupy a very large space.

A further object of this invention is the provision of a carrying device of the above stated character which will be simple, durable and efficient and which may be manufactured and sold at a comparatively low cost.

With these and other objects in view as will become more apparent as the description proceeds, this invention consists in certain novel features of construction, combination and arrangement of parts that will be hereinafter more fully described and claimed.

For a complete understanding of my invention, reference is to be had to the following description and accompanying drawings, in which Figure 1 is a sectional view illustrating a carrying device constructed in accordance with my invention.

Figure 2 is a sectional view taken on the line 2—2 of Figure 1.

Figure 3 is a sectional view taken on the line 3—3 of Figure 1 looking in the direction indicated by the arrows.

Figure 4 is a bottom plan view illustrating the arrangement of the wheels.

Referring in detail to the drawings, the numeral 1 indicates a metallic base having upstanding flanges 2 provided in the corners thereof with sleeves 3 to receive the lower ends of vertical members 4 of a frame 5. The members 4 may be secured in the sleeves 3 in any suitable way to prevent the frame 5 from becoming accidentally disconnected from the base during the use of the device.

A substantially U-shaped member 6 has the bight portion thereof riveted or otherwise secured to the base 1 adjacent one end and the arm portions are apertured to receive an axle 7 on which are journalled wheels 8. A forked member 9 is pivotally secured to the base 1 adjacent the other end thereof from the U-shaped member 6 and has journalled thereto a wheel 10 cooperating with the wheels 8 in supporting the device and which will permit the device to be conveniently moved over a surface from one place to another and steered in a desired direction. The wheels 8 and 10 are provided with rubber tires to cushion the device and further provide a sound deadening medium.

The vertical uprights 4 are connected at their upper ends by side and end members 11 and 12, respectively, and the members 4, 11 and 12 are preferably made from tubular material. The side members intermediate their ends are offset to form hand grips 13 disposed at opposite sides of the frame whereby the device can be conveniently lifted into and out of a vehicle or over obstructions. A suitable handle 14 is pivoted to the end members 12 intermediate their ends as shown at 15 whereby the device may be pushed or pulled from one place to another and which handle is capable of swinging downwardly as shown in Figure 2 out of the way so that a container or basket 16 may be placed in or removed from the frame by way of the upper end thereof.

The basket or container 16 is preferably constructed from woven wire or foraminous material and has the upper end fully opened to receive packages and articles and permit them to be removed when desired. Hooks 17 are carried by the upper end of the basket or container to engage over the side members 11 to support said basket or container within the frame 5 and which will permit the removal of the basket or container from the frame when desired. Suitable fasteners 18 are carried by the side members 11 for the purpose of attaching articles to the frame when desired.

If desired a suitable water proof covering may be provided for the container or basket.

From the foregoing description taken in connection with the accompanying drawings, it will be seen that a very efficient and durable carrying device has been provided wherein a great number of articles totaling considerable weight may be conveniently placed therein and moved or transported from one place to another without undue burden on a person, thereby providing a device especially adaptable for persons when shopping that the articles when purchased may be placed in the device and moved from one point within a store to another point and also for conveying such purchased articles from the store to a person's home. Further the device containing the articles may be conveniently lifted into and out of a vehicle and when in the latter will not occupy a large space.

While I have shown and described the preferred embodiment of my invention, it will be understood that minor changes in construction, combination and arrangement of parts may be made without departing from the spirit and scope as claimed.

Having thus described my invention, what I claim is:

A carrying device comprising a portable base, vertical uprights secured to the base, side and end members connecting the vertical uprights at their upper ends, said side members offset intermediate their ends to form hand grips, a handle pivoted to the end members intermediate their ends, and a container suspended from the side members within the vertical uprights and over the base and removable from said side members.

In testimony whereof I affix my signature.

GEORGE BETANCOURT.